United States Patent [19]

Suzuki et al.

[11] 4,151,592
[45] Apr. 24, 1979

[54] DATA TRANSFER CONTROL SYSTEM

[75] Inventors: Seigo Suzuki, Yokohama; Seiji Eguchi, Kawasaki, both of Japan

[73] Assignee: Tokyo Shibaura Electric Co., Ltd., Kawasaki, Japan

[21] Appl. No.: 732,968

[22] Filed: Oct. 15, 1976

[30] Foreign Application Priority Data

Oct. 15, 1975 [JP] Japan .................................. 50/124142

[51] Int. Cl.² .......................... G06F 9/18; G06F 15/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,445,822 | 5/1969 | Driscoll | 340/172.5 |
| 3,593,300 | 7/1971 | Driscoll et al. | 340/172.5 |
| 3,648,253 | 3/1972 | Mullery et al. | 340/172.5 |
| 3,710,351 | 1/1973 | Nakamura | 340/172.5 |
| 3,711,835 | 1/1973 | Jaeger et al. | 340/172.5 |
| 3,813,648 | 5/1974 | Huber | 340/172.5 |
| 3,820,079 | 6/1974 | Bergh et al. | 340/172.5 |
| 3,959,775 | 5/1976 | Valassis et al. | 340/172.5 |
| 3,964,054 | 6/1976 | Annunziata et al. | 340/172.5 |
| 4,040,028 | 8/1977 | Pauker et al. | 364/200 |

*Primary Examiner*—Mark E. Nusbaum
*Attorney, Agent, or Firm*—Finnegan, Henderson, Farabow & Garrett

[57] ABSTRACT

A data transfer control system for controlling the priority use of a common bus shared by a plurality of data processors which comprises a bus rank memory for storing signals denoting a demand for the priority use of the common bus which are supplied from said plural data processors; and a priority-detecting circuit for detecting the sequential priority positions of signals demanding the priority use of the common bus which are stored in said bus rank memory, wherein the plural data processors are supplied with a control signal instructing the use of the common bus or a waiting position for said use according to the sequential priority positions of the common bus use-demanding signals which have been detected by said priority-detecting circuit.

2 Claims, 2 Drawing Figures

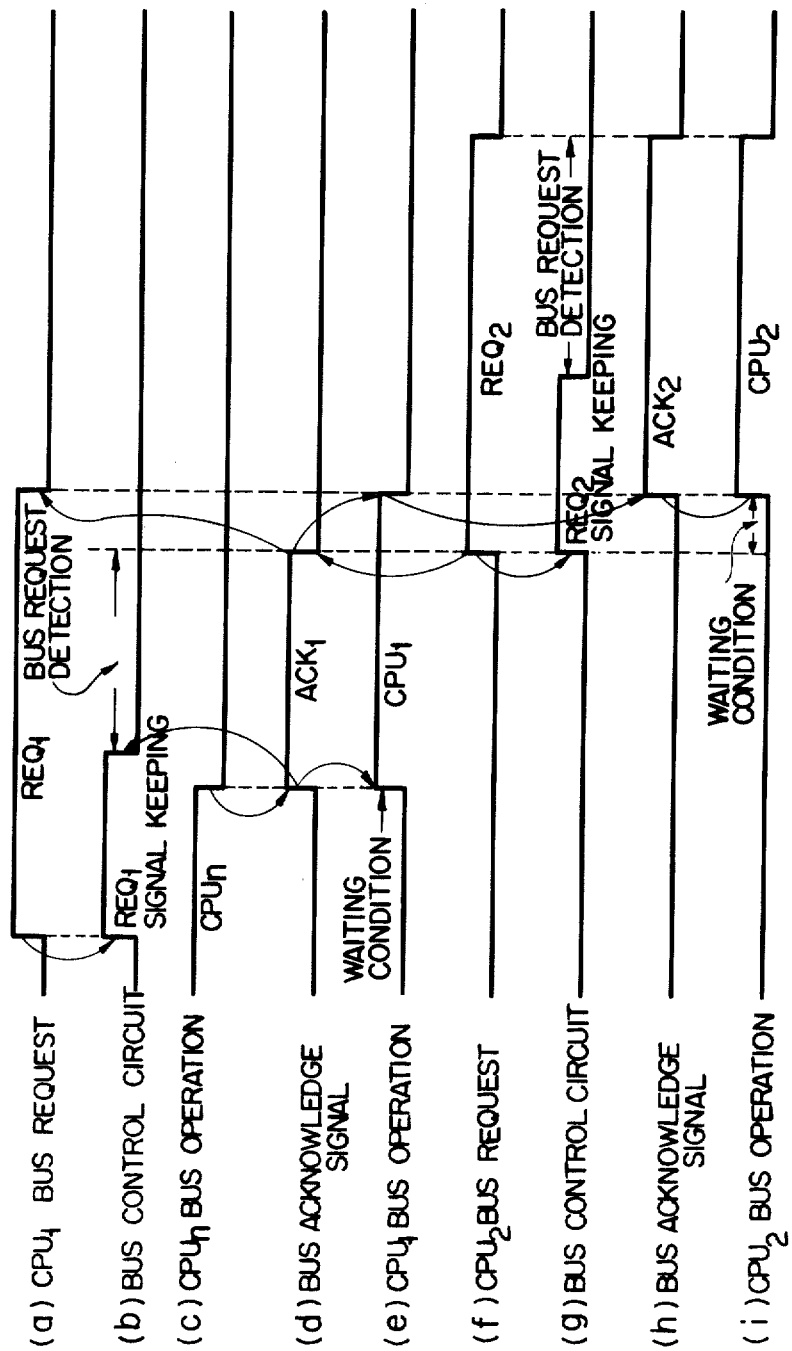

DATA TRANSFER CONTROL SYSTEM

BACKGROUND OF THE INVENTION

This invention relates to a data transfer control system and more particularly to a system for controlling the use of a common data transfer bus shared by a plurality of data processors.

With a complex system comprising a plurality of microcomputers or minicomputers, one common data transfer bus or shared-memory is shared by a plurality of data processors (abbreviated as "CPU"). For example, with a multiprocessor system, control of the priority use of the common bus should be efficiently carried out according to the sequential priority position of the selected one of said CPU's for said use.

To date, the use of a common bus has been controlled by receiving signals from the respective CPU's demanding the use of the common bus in the order of earlier arrivals or previously allotting a fixed priority to signals from the respective CPU's demanding the use of the common bus by means of hardware structure and receiving the common bus use-demanding signals according to the fixed sequential order of said allotted priorities. Once a selected CPU is allowed to use the common bus, the other CPU's are held in a waiting position, until the use of the common bus by said selected CPU is brought to an end.

One of the prior art common bus use-controlling systems, that is, the receipt of signals demanding the priority use of the common bus in the order of earlier arrivals, has the drawback that since no priority is taken into consideration with respect to these signals, a sudden important or urgent demand for the use of the common bus can not be successfully met. On the other hand, where the priority of using the common bus is fixedly allotted to the respective CPU's by means of hardware structure, then the following drawbacks arise. Namely, it is impossible to enable the whole multiprocessor system to admit of quick adjustment for changes in the priority order of signals demanding the use of the common bus caused by the variation of the type of processing job or the changing of processing jobs from one to another in said multiprocessor system. Further, where a specified CPU is allowed to use the common bus, for example, continuously for long hours, then the other CPU's are kept in a waiting position, until the use of the common bus by said specified CPU is brought to an end. Therefore, any of said other CPU's which happens urgently to demand the use of the common bus still have to be kept waiting long.

SUMMARY OF THE INVENTION

It is accordingly the object of this invention to provide a data transfer control system which allows the priority order of signals demanding the use of the common bus to be changed as need arises and which preferentially accepts an important or urgent demand for said use even while the common bus still remains operated.

According to an aspect of this invention, there is provided a data transfer control system for controlling the priority use of a common bus shared by a plurality of data processors, which comprises a bus rank memory admitting of data rewriting which is stored with signals from the plural data processors demanding the priority use of the common bus; means for detecting the sequential priority positions of signals denoting bus ranks which are stored in said memory; and means for controlling the use of the common bus according to that sequential priority position of signals from the plural data processors demanding the priority use of the common bus which has been detected by said detection circuit and supplying the selected data processor with a command instruction to use the common bus, wherein the bus rank memory admits of changes in the sequential priority order of signals from the plural data processors according to a program freshly prepared based on an urgent demand from any of said plural data processors for the priority use of the common bus; and when, even during the use of the common bus, any of the plural data processors issues an urgent or important demand of higher priority for the use of the common bus than that by which said common bus is now operated, then transfer of data is temporarily interrupted in such timing as enables one distinct set of data based on the demand of the preceding data processor to be fully transferred; and the common bus is released to permit its fresh operation based on the aforesaid higher priority demand.

BRIEF DESCRIPTION OF THE DRAWING

FIG. 2 is a time chart illustrating the operation of said data transfer control system, where any of the plural data processor issues a demand of higher priority for the use of a common bus than that by which said bus is now operated for the preceding data processor.

DETAILED DESCRIPTION OF THE INVENTION

Figure 1:
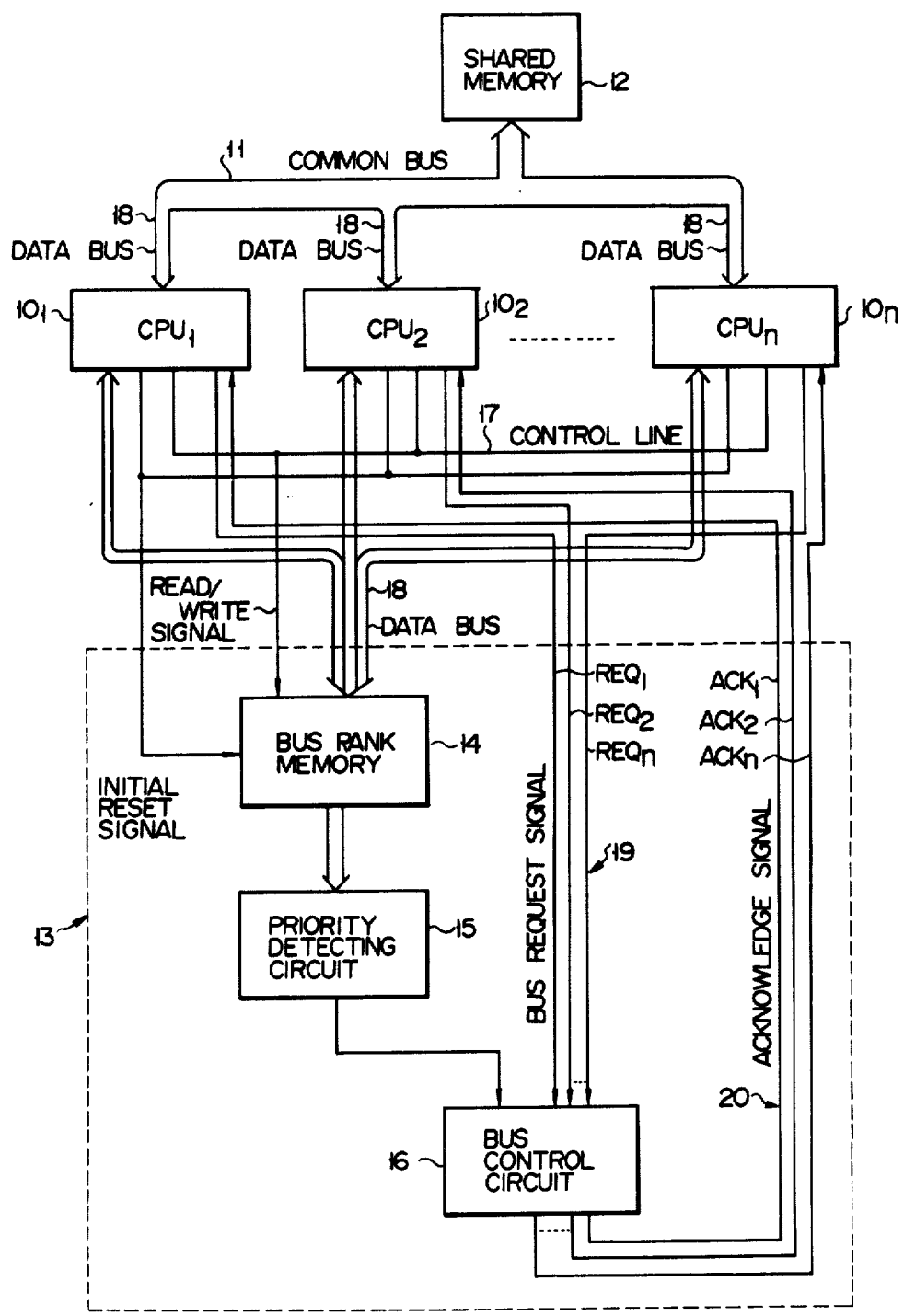
FIG. 1 is a block circuit diagram of a data transfer control system embodying this invention.

FIG. 1 is a block circuit diagram of a data transfer control system embodying this invention. The system comprises a plurality of microprocessors (CPU) $10_1$ to $10_n$ and a common bus 11 shared by these microprocessors. Data is transferred through the common bus 11 between the microprocessors $10_1$ to $10_n$ and shared memory 12 or shared input-output device controlled by a common bus control system 13 (enclosed in broken lines in FIG. 1). Where conflict arises between the demands of the CPU's $10_1$ to $10_n$ for the use of the common bus, then the common bus control system 13 accepts the demand of any of the CPU's selected according to a priority order prescribed for said CPU's, and allows the time share (or interleaved use) of the common bus for the selected CPU. The common bus control system 13 comprises a bus rank memory 14, priority-detecting circuit 15 and common bus control circuit 16. The bus rank memory 14 is formed of, for example, a read-write register for storing 4 bits code and is supplied through a control line 17 with, for example, a read-write control signal from the CPU's, and also with signals denoting the priorities of the CPU's through a data bus 18. Signals denoting said priorities are stored in the bus rank memory 14 upon recepit of a "write" control signal. Signals denoting the priorities of the CPU's for the use of the common bus 11 which are stored in said memory 14 are reset, for example, by an initializing signal delivered from the data transfer control system. Then, each CPU supplies a code signal representing the priority of the CPU to the memory 14. Contents of the bus rank memory 14 are sent forth to the priority-detecting circuit 15. This detecting circuit 15 can be easily formed of a known code detector. The priority-detecting circuit 15 detects the priorities of the respective CPU's $10_1$ to $10_n$ for the use of the common bus 11 according to bus rank data read out from the bus rank memory 14. An output priority signal from the priority-detecting circuit 15 is conducted to the common bus control circuit 16, which is also supplied with signals denoting the requests of the CPU's for the use of the common bus 11. The common bus control circuit 16 issues a common bus use-acknowledging signal (abbreviated as "ACK" signal) with respect to the demands of the CPU's for the use of the common bus 11 in accordance with data on the priority order delivered from the priority-detecting circuit 15. An ACK signal is issued to the selected one of the CPU's $10_1$ to $10_n$. The common bus control circuit 16 comprises a latch circuit (not shown) formed of a flip-flop circuit temporarily to store a bus request signal REQ 19 demanding the use of the common bus 11. The common bus control circuit 16 can be easily provided by the ordinary technique. The common bus request signal REQ 19 also functions as a status signal denoting the temporary exclusive use of the common bus 11. The common bus control circuit 16 also comprises means for indicating the temporary operation of the common bus 11 while it is being used by the selected CPU. When an ACK signal is supplied to a selected CPU, the selected CPU has the right for the temporary use of the common bus 11, with the result that data is transferred through the common bus 11 between said selected CPU and shared memory 12.

There will now be described by reference to the time chart of FIG. 2 the operation of the data transfer control system of FIG. 1. Now let it be assumed that a computer system carries out an ordinary job by means of the data transfer control system of this invention. First, an initial set signal is supplied from any CPU to the bus rank memory 14 to initialize the computer system. This initialize signal resets the bus rank memory 14 at the initial condition, that is, the memory 14 is all cleared. Later, the bus rank memory 14 is supplied with code signals denoting the priorities of the CPU's $10_1$ to $10_n$ through the data bus 18. The content of the bus rank memory 14 denoting the priorities of the CPU's $10_1$ to $10_n$ can be freely rearranged by programming to change the sequential priority orders of the CPU's $10_1$ to $10_n$ relative to the temporary exclusive use of the common bus 11. Signals denoting the sequential priority orders of the CPU's $10_1$ to $10_n$ stored in the bus rank memory 14 are read out to the priority-detecting circuit 15. This priority-detecting circuit 15 determines the sequential priority orders of the demands of the CPU's $10_1$ to $10_n$ for the temporary exclusive use of the common bus 11 in accordance with received data on the CPU priorities. The information representing the sequential priority orders is supplied as an output signal from the priority detecting circuit 15 to the common bus control circuit 16. The circuit 16 in turn selects the request signal fed from the respective CPU having the highest priority based on the information representing the sequential priority orders sent from detecting circuit 15, thus determining the CPU whose request for the use of the common bus has the highest priority. For example, an ACK INH signal ij (representing the inhibition i of acknowledge j) issued from the common bus control circuit 16 stops the use of the common bus 11 by a CPU having, for example, a lower sequential priority level i than the sequential priority level j of another CPU, and keeps the former CPU currently using the common bus in a waiting condition, and allows the use of the common bus 11 by the latter CPU whose demand for the use of the common bus has a higher sequential priority level j than the former CPU. Thus, the bus control circuit 16 allows the selected CPU to use the common bus 11.

When, as shown in FIG. 2(a), the CPU $10_1$ sends forth a request signal $REQ_1$ for the use of the common bus 11 to the bus control circuit 16, then a signal denoting said request signal $REQ_1$ is stored in the latch circuit of said bus control circuit 16 as shown in FIG. 2(b). Thus, bus control circuit 16 detects whether the common bus 11 is currently used and also whether any other CPU has issued a demand of higher order for the use of the common bus 11. Where the common bus control circuit 16 judges that the common bus 11 is currently used or any other CPU has suddenly sent forth a demand of higher priority for the use of the common bus 11, then said control circuit 16 does not produce an ACK signal permitting the use of the common bus 11, but keeps other CPU's in a waiting condition relative to said use. Where, as shown in FIG. 2(c), the common bus 11 is released upon completion of its use by the CPU $10_n$, then the bus control circuit 16 issues, as shown in FIG. 2(d), a permission $ACK_1$ for the use of the common bus to the CPU $10_1$ which has been kept in a waiting condition. Then the CPU $10_1$ exclusively uses the common bus 11, as shown in FIG. 2(e) to transfer data between said CPU $10_1$ and shared memory 12. Upon operation of the common bus 11, a request signal $REQ_1$ stored in the latch circuit of the common bus control circuit 16 is reset. When the latch circuit is reset, the common bus control circuit 16 commences the detection of a succeeding request signal REQ for the common bus 11. When the common bus control circuit 16 receives a request signal $REQ_2$ from the CPU $10_2$ whose demand for the use of the common bus 11 has a higher priority than that by which the CPU $10_1$ is now using the common bus 11 shown in FIG. 2(f), then the previously issued permission signal $ACK_1$ is reset to stop the exclusive use of the common bus 11 by the CPU $10_1$ shown in FIG. 2(d). Then, as shown in FIG. 2(e), the CPU $10_1$ stops its use of the common bus 11 in such timing that one distinct set of data based on the demand of the CPU $10_1$ can be fully transferred between said CPU $10_1$ and shared memory 12. The request signal $REQ_2$ of the CPU $10_2$ for the use of the common bus 11 is stored in the bus control circuit 16, as shown in FIG. 2(g). Upon release of the common bus 11 after the stop of its use by the CPU $10_2$ shown in FIG. 2(e), the common bus control circuit 16 accepts a demand of higher priority from the CPU $10_2$ for the use of the common bus 11 and supplies the CPU $10_2$ with a signal $ACK_2$ permitting the use of the common bus 11. Thus the CPU $10_2$ begins to use the common bus 11 as shown in FIG. 2(i).

The data transfer control system of this invention enabling the content of the bus rank memory 14 to be rearranged by programming can be readily adjusted for changes in the priority order of the requests of the respective CPU's for the use of the common bus caused by the variation of the type of a processing job or by the changing of processing jobs from one to another in a multiprocess system, thus providing a high flexibility of application. Further, the present data transfer control system releases a common bus 11 for a CPU whose request for its use has a higher priority than the preceding CPU currently using said common bus 11, thereby quickly meeting any sudden important or urgent request for the use of the common bus 11.

What we claim is:

1. A data transfer control system for controlling the priority use of a common bus connected to and shared by a plurality of data processors having a priority order that can be changed comprising bus rank memory means, means for transferring to said bus rank memory means priority codes sent from said plurality of data processors, detection means connected to said bus rank memory means to detect the order of priority levels of said priority codes and generate an output priority signal indicative of the priority order of said data processors, means in each data processor for generating common bus request signals, and common bus control means connected to said detection means and said plurality of data processors to receive the common bus request signals generated by the data processors, to select in response to the output priority signal from said detection means the data processor supplying a common bus request signal having the highest priority and to supply a permit signal to the selected data processor, thereby permitting exclusive use of the common bus by said selected data processor, said bus control means including means for stopping data transfer by a first data processor having exclusive use of the common bus and for permitting a second data processor to exclusively use the common bus when the second data processor produces a common bus request signal and has a higher priority order than the first data processor.

2. A data transfer control system according to claim 1 wherein said bus rank memory means includes a re-write memory means having an address part addressed to each respective data processor and each data processor includes means for applying a priority code designated by said data processor having a changed priority level to a predetermined address of said bus rank memory means whereby the priority level of said priority codes in said bus rank memory means is rearranged.

* * * * *